United States Patent [19]

Scott et al.

[11] 3,728,639

[45] Apr. 17, 1973

[54] ELECTROMAGNETIC INTENSIFIER

[75] Inventors: Harold W. Scott, Ridgefield; Monroe R. Kelemencky, Woodbury, both of Conn.

[73] Assignee: Basic Sciences Corp., Bethel, Conn.

[22] Filed: Aug. 4, 1970

[21] Appl. No.: 60,789

[52] U.S. Cl. ................................................. 331/94.5
[51] Int. Cl. .................................................. H01s 3/02
[58] Field of Search ..................... 331/94.5; 350/151, 350/147

[56] References Cited

UNITED STATES PATENTS

| 3,243,724 | 3/1966 | Vuylsteke | 331/94.5 |
| 3,277,392 | 10/1966 | Nicolai | 331/94.5 |
| 3,495,189 | 2/1970 | Le Craw | 331/94.5 |
| 3,500,233 | 3/1970 | Doyle et al. | 331/94.5 |
| 3,571,744 | 3/1971 | Hook et al. | 331/94.5 |
| 3,576,502 | 4/1971 | Johnston et al. | 331/94.5 |

*Primary Examiner*—William L. Sikes
*Attorney*—Curtis, Morris and Safford

[57] ABSTRACT

An apparatus for varying the intensity of electromagnetic radiation, having a soure of polarized electromagnetic radiation, a cavity for receiving the radiation from the source and reflecting said radiation in the cavity, and means associated with the cavity for adjustably varying the angular rotation of the electromagnetic radiation in the cavity and thereby varying the intensity of the radiation. The invention also provides a method of varying the intensity of a beam of polarized electromagnetic radiation by varying the angular rotation in the plane of polarization of said radiation.

10 Claims, 6 Drawing Figures

INVENTORS
HAROLD W. SCOTT
MONROE R. KELEMENCKY

ELECTROMAGNETIC INTENSIFIER

The invention relates to means for, and methods of, varying and intensifying electromagnetic radiation.

Microwave devices such as klystrons, magnetrons, and traveling wave tubes, are of the type used to intensify electromagnetic radiation, however, they are restricted to a particular frequency spectrum and possess inherent limitations as to output and tuning performance. Lasers or optical masers, on the other hand are coherent wave output devices mainly in the visible and near ultraviolet spectrum. They too, possess inherent limitations on continuous power and are restricted to particular frequencies due to the nature of the process and available materials. At the present time, there are no known devices which intensify electromagnetic radiation in far ultraviolet and x-ray spectrum.

A particular example in which there is a need for an intense source of electromagnetic radiation in the x-ray spectrum, is in the deactivation of radioactive nuclear material, as explained in our copending U.S. Pat. application, Ser. No. 854,578 filed September 2, 1969 and now abandoned.

The present invention departs from the above enumerated known devices and is a novel means for, and method of, intensifying an electromagnetic wave. This invention is applicable to any frequency in the microwave, infrared, visible light, ultraviolet and x-ray spectrum, where a high powered wave is desired.

The present invention employs an effect which up till now was a laboratory curiosity. By properly employing this effect, the unexpected result of substantial electromagnetic intensification can be achieved. In the last century, Michael Faraday discovered the theoretically very important phenomenon of magnetic gyration. When a transparent substance is in a strong magnetic field; and a beam of polarized light is passed through it, along the direction of the field, the light has its direction or plane of polarization rotated. This discovery is called the "Faraday Effect." In the Faraday Effect, the angle of rotation of the plane of polarization L is given by $L=VHd$, in which the coefficient V, known as the Verdet constant, depends on the wavelength of the radiation and material of the medium. The magnetic field is expressed as H, and the distance of the medium through which the beam passes is "d" in the equation. The amount of rotation, of the angle of rotation, increases with decreasing wavelength, and conversely the amount of rotation decreases as the wavelength increases. The rotation is in the same sense for either direction of propagation of the wave, and so the total rotation can be multiplied by reflecting the beam back and forth many times through the magnetic field.

A method of demonstrating the Faraday Effect has been to pass a beam of polarized light through a medium such as a thin film of iron or ferrite with the magnetic field parallel to and contained within the beam and the medium. Rotation of the beam was observed through a polarizer. In some cases the beam was reflected back and forth through the medium, and in each case the rotation was increased proportional to the number of passes. What is important to note here is that in no instances has a reference been made to the increase in the intensity of the beam due to rotation. It is our discovery that the intensity of the light is measurably increased as an electromagnetic wave is passed through a medium to which is applied a magnetic field. This conclusion may be explained by a corpuscular theory of electromagnetic radiation. As the wavelength becomes shorter, the wave properties steadily give place to corpuscular properties which in turn more readily react with the medium and the magnetic field, and therefore, there is an increase in rotary power.

Heretofore, there has been no appreciation that a substantial amplification of electromagnetic radiation can be achieved by the interaction of the electromagnetic field, the medium through which it is passing, and magnetic field of the medium.

Furthermore, the techniques taught in this application may be used to modulate a beam of light. The modulation of the beam may be accomplished by matching a transmitter to a receiver and detecting the angular velocity changes or degree of rotation changes of the beam.

It is an object of the present invention to provide a method of, and means for, varying the intensity of electromagnetic radiation.

It is another aspect of the present invention to provide a method and device which intensifies any particular wavelength or frequency of electromagnetic radiation and produce a collimated and/or coherent output ray or electrowave.

It is further an object of the present invention to provide an electromagnetic radiation intensified device which is efficient, simple, and reliable in operation.

It is another object of the present invention to provide a novel means of modulating a beam of light.

It is still another object of the present invention to provide beam modulation by introducing an angular velocity change or degree of rotation change of the beam in accordance with a modulating signal, and matching the transmitter to the receiver to detect said changes.

According to the invention, there is provided an apparatus for varying the intensity of electromagnetic radiation, said apparatus having a source of polarized electromagnetic radiation, a cavity for receiving the radiation from the source and reflecting said radiation in the cavity, and means associated with the cavity for adjustably varying the angular rotation of the electromagnetic radiation in the cavity and thereby varying the intensity of the radiation. The invention also provides a method of varying the intensity of a beam of polarized electromagnetic radiation by varying the angular rotation in the plane of polarization of said radiation.

The construction of illustrative embodiments as well as further objects and advantages thereof, will become apparent when read in conjunction with the accompanying drawings wherein.

Figure 1:
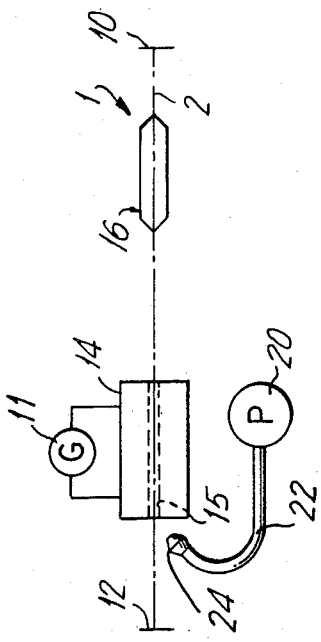
FIG. 1 is a schematic representation of the energy intensifier device of the invention and an electromagnetic radiation source.

In FIG. 1 there is shown in schematic form, one embodiment of the invention. An optical cavity 1 is shown with a beam of light 2 reflected between two parallel mirrors 10, 12. One mirror 10, is a reflecting mirror and the other 12, is a semitransparent mirror. The mirrors are located at some distance apart and are perpendicular to the axis of the light. The semitransparent mirror 12 is of a kind adapted to pass a which percentage of light, and reflect the remaining percentage of light. The mirror 12 is the output point of the light intensifier. Between these two mirrors is a solenoid coil 14 having a hollow central region 15 coaxial with the light beam 2. The coil is connected to a source of electric current 11. The input to the cavity (or source of the light beam) is an electromagnetic wave source 16 which is also in the cavity. The source 16 is for example, a helium-neon laser tube. When current is applied to the tube, a red glow commences and a faint red beam shines in the cavity and from the semitransparent mirror 12. As current from the source 11 is applied to the solenoid coil 14, the beam shines brighter. Thus, by applying a magnetic field from the solenoid 14 to the electromagnetic beam, reflecting in the cavity, the intensity of the beam is increased.

The medium in the center 15 of solenoid coil in this case is still air. Normally, it would be expected that no change to the beam would be produced with air as a medium because of its very small Verdet constant. However, it must be remembered that this beam is being reflected back and forth hundreds of times through the magnetic field and the medium per millisecond.

Figure 2:
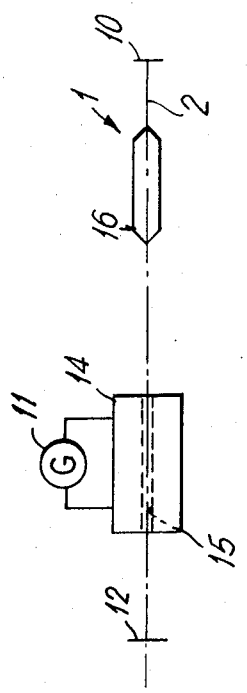
FIG. 2 is a schematic representation of an alternative embodiment similar to the embodiment of FIG. 1.

FIG. 2 is a schematic drawing showing a modification of the embodiment of FIG. 1. Like elements in both figures bear like legend. In FIG. 1 the medium in the center 15 of the solenoid 14 and through which the electromagnetic radiation 2 passes is static air. In FIG. 2 the medium in the center of the solenoid is a slowly moving flow of air. A pump 20 provides air pressure in a hose 22 which terminates in a nozzle 24 located near one side of the center 15 of solenoid 14. When a flow of air from nozzle 24 is introduced into the center of the solenoid coil 14, the beam emitting from the semitransparent window 12 becomes very bright.

If the air medium in the center of the solenoid is replaced by a paramagnetic gas such as oxygen or nitric oxide an even greater intensity of electromagnetic radiation is realized.

Alternatively, solid media may be placed in the solenoid cavity 15. It has also been observed that the intensity of the beam increases when the gas medium is heated.

A theoretical explanation may be offered at this point. The medium in the cavity 15 is matter. And all matter is composed of atoms. When an atom is in the presence of a magnetic field, it behaves as though it were in rotation about an axis along the field direction. The velocity is proportional to the field strength. If the atom is illuminated by circularly polarized light, it will react differently according to whether its magnetic rotation is with, or against, the rotation of the circularly polarized light vector. Atoms react with the light by emitting waves of the same frequency as the incident light, and in a different phase relation to the incident light. This process, is responsible for refraction, double refraction, and gyration. When heat is applied to the atom, or when the atoms are heated, their rotational states change and take on a higher level. The intensities of the rotational states are proportional to the square of the change in dipole moment occuring during a rotation. It is, therefore, evident that when a beam of electromagnetic radiation is circularly polarized in a magnetic field and in a medium, the beam is intensified to an amount almost equal to the energy input within the optical cavity.

Figure 3:
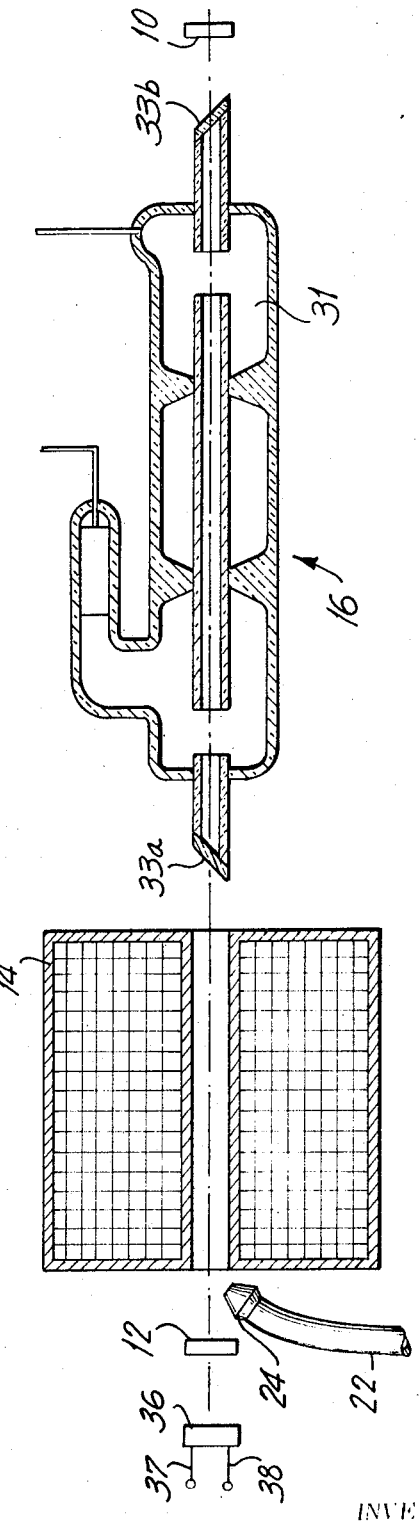
FIG. 3 is a detailed sectional representation of an electromagnetic wave intensifying device of a kind shown schematically in FIG. 2.

FIG. 3 is a detailed sectional drawing of part of the embodiment shown schematically in FIG. 2. Like elements in both figures bear like legend. The sectional drawing is taken in a plane along the axis of the cavity. The electromagnetic radiation source 16 is shown here as a tube 31 of a neon-helium laser which provides E-M radiation of $6,328_A$ wavelength. The light beam is shown here as the line 2. The ends of the laser tube 31 are provided with two Brewster windows 33a and 33b of conventional design, which pass plain polarized light. Alternatively, windows may be used which will pass circular polarized light. In a laboratory demonstration model, a typical length of the tube 16 from windows 33a and 33b is 11 inches. Mirror 10 is any convenient or conventional reflection mirror and is aligned perpendicular to the light beam 2. Typically, it is displaced one-eighth inch from the end 33b of the tube 16. Solenoid 14 is shown here as having four sections or coils of 3,000 turns each and the length of each coil is two inches, and the diameter of the central portion 15 is one-fourth inch. A D.C. current of approximately four amperes was applied to each coil. (An A.C. coil may be used with a 60 cps voltage.) The solenoid is spaced typically one-eighth inch from the end 33a of the tube 16.

Air from hose 22 and nozzle 24 flows through the central portion of the solenoid 14. The flow of air from the central portion 15 was very gentle, and the air may be directed to flow straight through or at an angle as shown in FIG. 3.

Semireflecting mirror 12 is the kind which transmits a portion of the light, and reflects a portion of the light. Typically, the semireflecting mirror 12 is located perpendicular to the beam of light 2 and is displaced typically 1 ¼ inches from the end of the solenoid 12, concave, and in the example a mirror with a 50 mm. focal length has been found to produce good results.

To measure the intensity of light, a photocell 36 is located to receive the light transmitted through the semireflecting mirror 12, and as shown here is aligned perpendicular to the light beam 2. Photocell 36 is of a kind which produces an electrical current in accordance with the intensity of the received light. Two leads 37, 38 form part of the photocell 36 and transmit the induced electrical signal to a measuring device such as an ammeter (not shown). A laboratory model, similar to the embodiment shown in FIG. 3, was built, and the intensity of current from the photocell 36 was measured. This current is proportional to the intensity of light falling on the photocell. In one set of measurements, current was first measured with no potential being applied to the solenoid 14, and the measured current was approximately 5 microamps. Current and air was then applied to the solenoid 14 and the intensity of current measured at photocell 36 was 48 microamps. A non-quantative measurement was also made by observing the beam, and a marked increase in the intensity of the beam was noticed when current and air was applied to the solenoid.

Figure 4:
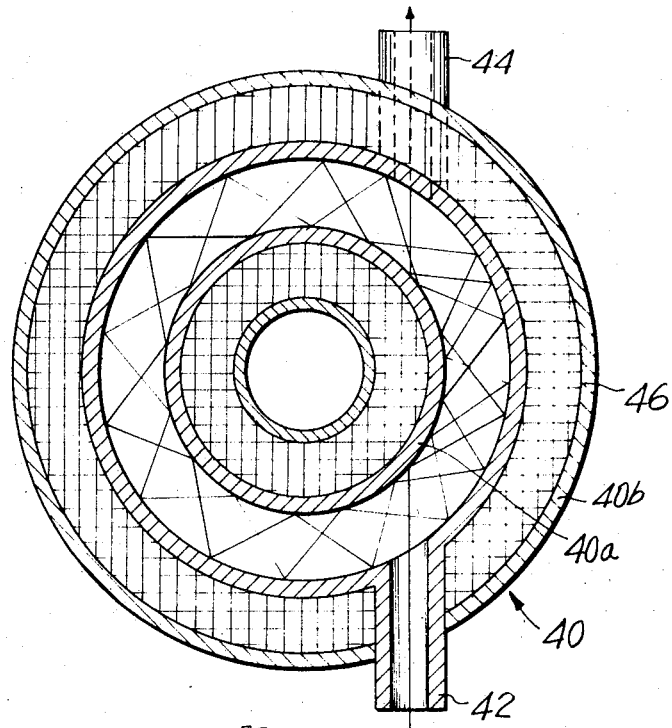
FIG. 4 is a sectional view of an alternative electromagnetic wave intensifying device.

Referring now to FIG. 4 of the drawings, there is shown a further embodiment of the invention. The figure is a cut away sectional view of a circular guide 40 having an inner wall 40a and an outer wall 40b. An entry port 42 provides access to the circular guide, and an electromagnetic beam typically in the ultraviolet or x-ray spectrum is applied at the entry port 42. The light 2 enters the circular cavity at such an angle as to be completely reflected from both of the walls 40a and 40b. The beam is inclined at an entry angle, such that after many reflections and after passing around the guide, it will arrive at a point where an exit port 44 is provided. At that point, the light will pass through the exit port 44 and leave the guide. The arrangement of such circular guides is conventional. Around the walls of the guide 40, are provided a plurality of solenoids 46 which set up a magnetic field in the space of the guide. Thus, as the beam of light 2 moves many times around and around in the guide before exiting at exit 44, it is subject to a magnetic field from the windings 46. The medium between the walls 40a and 40b may be air. But preferably it is medium having a high Verdet constant so as to give a large rotation to the light beam, and thus add a large intensity to the light beam. The electromagnetic radiation provided to the port 42 may come from any convenient or conventional source such as a laser or an ultraviolet tube or x-ray tube. The circular guide on FIG. 4 will find particular use in intensifying radiation in ultraviolet or x-ray spectrum.

Figure 5:
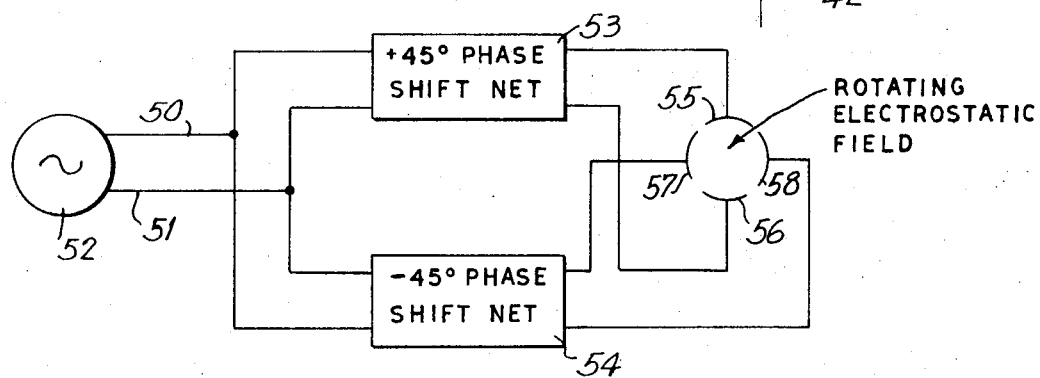
FIG. 5 is a schematic diagram of a circuit providing a rotating electrostatic field.

FIG. 5 is a schematic diagram of a portion of an alternative embodiment, and shows a circuit to produce a rotating electrostatic field. In this alternative embodiment, the beam of electromagnetic radiation may be passed through a rotating electrostatic field. The rotating electrostatic field will increase the angular rotating velocity of the radiation. In FIG. 5 there is shown a pair of leads, 50 and 51, which are connected to an A.C. supply 52. The A.C. signal is applied to a pair of 45° phase shift networks, 53 and 54. Phase shift network 53 advances the phase of the A.C. signal by 45°; while phase shift network 54 retards the A.C. signal by 45°. The 45° phase advanced signal from network 53 is applied to plates 55 and 56 which partially surround a region through which the electromagnetic beam will pass. The output from the 45° phase retarded network 54, is applied to plates 57 and 58 which are disposed about the same path through which the beam will pass. The plates 55, 56, 57, and 58 are so arranged that a rotating electrostatic field is set up in the area they surround. The plates for setting up the electrostatic field may be arranged in any convenient configuration, for example, they may form the walls or surround the walls of the guide of the shape shown in FIG. 4. In this arrangement, the beam passes in only one direction through the rotating electrostatic field. Alternatively, the rotating electrostatic field may be disposed about a beam which is reflected back and forth in a cavity such as shown schematically in FIG. 1.

Figure 6:
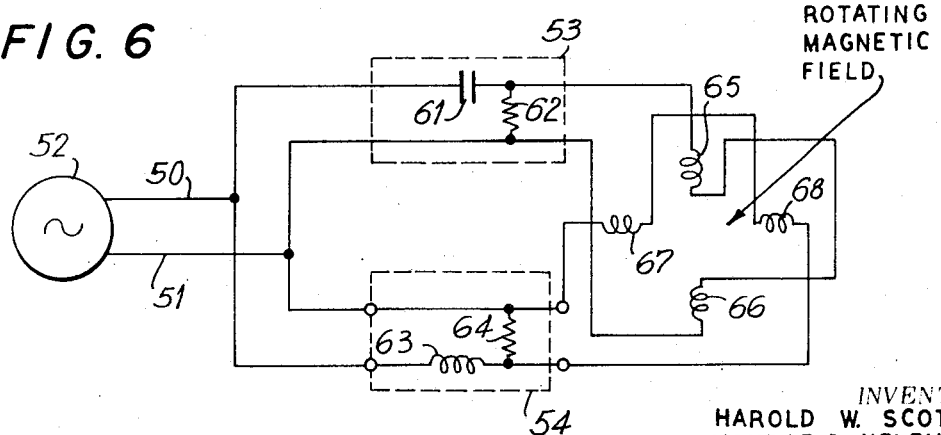
FIG. 6 is a schematic drawing of a circuit providing a rotating magnetic field.

FIG. 6 is a schematic diagram showing a circuit for producing a rotating magnetic field. The circuit of FIG. 6 is similar to that of FIG. 5 and like elements in both figures bear like legends. An alternating signal from the A.C. supply 52 is applied to the 45° phase shift network 53 which is shown here as having a capacitor 61 and a resistor 62 arranged in conventional fashion for a positive phase shift. The 45° phase retarded signal from network 54 is shown here as having a series inductor 63 and a shunt resistor 64. The output from the 45° phase advance network 53 is applied to a pair of windings 65 and 66 which induce an electromagnetic field in this space between them. The output from 45° phase retarding network 54 is applied to a pair of windings 67 and 68. The windings 65 through 68 are disposed about a space through which the beam will pass, and are arranged in fashion to set up a rotating electromagnetic field. The output windings 65 through 68 may be disposed about the aperture of a circular guide, of the kind shown in FIG. 4, so that the rotating field is applied to a beam which passes continuously in the same direction. Alternatively, the rotating electromagnetic field may be applied to a beam which is reflecting back and forth in a cavity, as shown schematically in FIG. 1.

The above description of the invention is intended to be illustrative only, and various changes and modifications in the embodiments described may occur to those skilled in the art. These changes may be made without departing from the scope of the invention, and thus it should be apparent that the invention is not limited to the specific embodiments described or illustrated in the drawings.

We claim:

1. An apparatus for intensifying electromagnetic radiation comprising a source of polarized electromagnetic radiation, a cavity for receiving the radiation from the source and reflecting said radiation in said cavity, a medium within said cavity exhibiting a Faraday effect, means for moving said medium through the cavity, means associated with said cavity for angularly rotating the electromagnetic radiation therein and thereby increasing the intensity of said radiation, said means for angularly rotating the electromagnetic radiation in the moving medium in said cavity being a source for a magnetic field wherein said field traverses said medium.

2. An apparatus according to claim 1, wherein said electromagnetic radiation source is designed to emit light at a wavelength in the range of 3 centimeters to .01 angstroms.

3. An apparatus according to claim 1, wherein the magnetic field is provided by a solenoid coil disposed externally to the path of the electromagnetic radiation through said medium.

4. An apparatus according to claim 1, wherein said medium is a gas.

5. An apparatus according to claim 5 and further including means for directing said gas to flow in a helical path in said cavity.

6. An apparatus according to claim 1, wherein said means for angularly rotating the electromagnetic radiation is a source for producing a rotating magnetic field external to a path of said beam in the cavity.

7. A method of intensifying polarized electromagnetic radiation in the wavelength of 3 centimeters to 0.1 angstroms, comprising the steps of passing a beam of radiation through a medium in the form of a moving gas and applying a magnetic field to the medium for increasing the angular velocity of the polarized radiation and thereby increase its intensity, said medium exhibiting a "Faraday Effect."

8. A method for intensifying electromagnetic radiation comprising the steps of passing a beam of polarized electromagnetic radiation through a moving medium, applying a magnetic field to said medium and to said beam as it passes through said medium for rotating the electromagnetic radiation about its axis of propagation and thereby increase the intensity of said electromagnetic radiation, said medium exhibiting a "Faraday Effect."

9. A method for intensifying electromagnetic radiation according to claim 8, including the steps of reflecting said radiation back and forth through said medium.

10. A method according to claim 8, including the further step of moving the medium through which the radiation is reflected said movement being at least partially in the direction of propagation.

* * * * *